United States Patent [19]
Kataoka et al.

[11] Patent Number: 5,966,472
[45] Date of Patent: Oct. 12, 1999

[54] METHOD FOR AUTOMATIC RECOGNITION OF A CONCAVITY OR CONVEXITY

[75] Inventors: Takayuki Kataoka; Ken'ichiro Matsumoto, both of Osaka, Japan

[73] Assignee: Komatsu Limited, Tokyo, Japan

[21] Appl. No.: 08/906,172

[22] Filed: Aug. 5, 1997

[30] Foreign Application Priority Data

Aug. 7, 1996 [JP] Japan ..................... 8-208226

[51] Int. Cl.$^6$ ............... G06K 9/36; G06K 9/00; G06K 9/56
[52] U.S. Cl. ............ 382/291; 382/151; 382/205
[58] Field of Search ............... 382/149, 288, 382/291, 204

[56] References Cited

U.S. PATENT DOCUMENTS 4,555,798  11/1985  Broadbent, Jr. et al. ............... 382/205
5,778,107  7/1998  Kataoka ................................. 382/291

FOREIGN PATENT DOCUMENTS 7-82548  1/1989  Japan .

Primary Examiner—Leo H. Boudreau
Assistant Examiner—Shawn B. Cage
Attorney, Agent, or Firm—Nikaido Marmelstein Murray & Oram LLP

[57] ABSTRACT

An automatic recognition method capable of accurately determining edges of a concavity or convexity in order to achieve an improved measuring accuracy in recognition of a concavity or convexity. This method comprises the steps of: converting a photographic image of an object having a concavity or convexity defined therein into data in a specified feature space; obtaining a plurality of points that exist outside a virtual circle determined by a virtual center of the concavity or convexity, the virtual center being established for each elementary area of the image converted into the feature space data; obtaining the equation of a plane that passes through the plurality of points; detecting symmetric pairs of pixels in each elementary area of the feature space data with respect to the corresponding virtual concavity or convexity center; and recognizing the position of the concavity or convexity of the object when the symmetric pixels satisfy the equation of the plane.

5 Claims, 9 Drawing Sheets

FIG.7

|   |   |   |   |   |
|---|---|---|---|---|
| 3 | 4 | 4 | 4 | 5 |
| 2 | 3 | 4 | 5 | 6 |
| 2 | 2 | 8 | 6 | 6 |
| 2 | 1 | 0 | 7 | 6 |
| 1 | 0 | 0 | 0 | 7 |

FIG.8

| 0 | 1 | 2 | 3 | 4 | 5 | 6 | 7 |
|---|---|---|---|---|---|---|---|
| 1 1 1 | 1 1 1 | -1 1 1 | -1 -1 1 | -1 -1 -1 | 1 -1 -1 | 1 1 -1 | 1 1 1 |
| 1 -2 1 | -1 -2 1 | -1 -2 1 | -1 -2 1 | 1 -2 1 | 1 -2 -1 | 1 -2 -1 | 1 -2 -1 |
| -1 -1 -1 | -1 -1 1 | -1 1 1 | 1 1 1 | 1 1 1 | 1 1 1 | 1 1 -1 | 1 -1 -1 |
| ↑ | ↗ | → | ↘ | ↓ | ↙ | ← | ↖ |

FIG.9(a)

| 1 | 1 | 0 |   |   |
|---|---|---|---|---|
| 1 | A | 0 |   |   |
| 0 | 0 | 0 |   |   |
|   |   |   |   |   |
|   |   |   |   |   |

FIG.9(b)

|   |   |   |   |   |
|---|---|---|---|---|
|   | 1 | 1 | 1 |   |
|   | 1 | A | 1 |   |
|   | 1 | 1 | 1 |   |
|   |   |   |   |   |

| A 0 | 1 0 | C 2 0 | 3 0 | 4 0 | 5 0 | 6 0 |
|---|---|---|---|---|---|---|
| 0 | 1 0 | 2 0 | 3 0 | 4 0 | 5 0 | 6 0 |
| D 0 | 1 0 | B 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |

FIG. 14

| A 0 | C 0 | 0 | 0 | 0 | 0 | 0 |
|---|---|---|---|---|---|---|
| 1 0 | 1 0 | 1 0 | 1 0 | 1 0 | 1 0 | 1 0 |
| D 2 0 | B 2 0 | 2 0 | 2 0 | 2 0 | 2 0 | 2 0 |
| 3 0 | 3 0 | 3 0 | 3 0 | 3 0 | 3 0 | 3 0 |
| 4 0 | 4 0 | 4 0 | 4 0 | 4 0 | 4 0 | 4 0 |
| 5 0 | 5 0 | 5 0 | 5 0 | 5 0 | 5 0 | 5 0 |
| 6 0 | 6 0 | 6 0 | 6 0 | 6 0 | 6 0 | 6 0 |

FIG. 15

| A 40 | 40 | C 40 | 40 | 40 | 40 | 40 |
|---|---|---|---|---|---|---|
| 40 | 50 | 50 | 50 | 50 | 50 | 40 |
| D 40 | 50 | B 70 | 80 | 70 | 50 | 40 |
| 40 | 50 | 80 | 80 | 80 | 50 | 40 |
| 40 | 50 | 70 | 80 | 70 | 50 | 40 |
| 40 | 50 | 50 | 50 | 50 | 50 | 40 |
| 40 | 40 | 40 | 40 | 40 | 40 | 40 |

FIG. 16

| 1 | 2 | 3 | 4 | 5 | 6 |
|---|---|---|---|---|---|
| (1, 0, 0) | (0, 1, 0) | (0, 0, 1) | (-1, 0, 0) | (0, -1, 0) | (0, 0, -1) |

FIG. 17

|   |   |   |   |   |
|---|---|---|---|---|
| 6 | 2 | 2 | 2 | 6 |
| 1 | 6 | 2 | 6 | 4 |
| 1 | 1 | 6 | 4 | 4 |
| 1 | 6 | 5 | 6 | 4 |
| 6 | 5 | 5 | 5 | 6 |

FIG. 18

METHOD FOR AUTOMATIC RECOGNITION OF A CONCAVITY OR CONVEXITY

TECHNICAL FIELD

The present invention relates to an automatic recognition method for recognizing the position of a concavity or convexity defined in an object, based on the photographic image of the object, and in particular, to an automatic recognition method well suited for use in industrial robots, automatic vehicle monitoring systems or the like.

BACKGROUND ART

One known position recognition method of the above type is designed such that when recognizing the position of, for example, a hole which is a typical form of concavities defined in an object, position recognition is achieved by estimating the center of the contour (i.e., circle or ellipse) of the hole by Hough conversion. Another known method is designed to recognize the position of a hole by obtaining the correlation between the contour of the object hole to be recognized and a preliminarily registered hole contour (circle or ellipse) by use of normalized cross correlation.

These methods, however, present disadvantages. The former method needs vast amounts of storage capacity and long processing time since the estimation of the center of a circle or ellipse is carried out based on a three-dimensional space and therefore this method is not suitable for practical use. The latter method suffers from the problem that the shape of a circle or ellipse registered as the two-dimensional projection of a hole itself is limited, so that position recognition cannot be achieved in cases where a hole to be recognized is enlarged, reduced or rotated.

As an attempt to overcome the foregoing problems, the applicant has proposed a position recognition method in Japanese Patent Laid-Open Publication No. 7-229717 (1995) in which a photographic image of an object having a concavity or convexity is first converted into data in a specified feature space; symmetric pairs of pixels within each elementary area of the converted image with respect to a virtual center of the concavity or convexity are then detected; and the position of the concavity or convexity is recognized based on the detection. According to this position recognition method, not only the storage capacity but also processing time can be reduced and the position of a concavity or convexity defined in an object can be recognized irrespective of the posture of the object photographed within a three-dimensional space.

Another prior art relating to the invention is disclosed in Japanese Patent Laid-Open Publication No. 7-225843 (1995). This publication relates to a method for measuring the center of a circle, and is designed such that edges of a circle are detected from a two-dimensional image of the circle; the circumference of the circle is estimated from the set of edges utilizing the mean fourth-power error minimization; and the center of the circle is estimated from a set of edges excluding edges that are distant from the estimated circumference of the circle.

The above position recognition method proposed by the applicant has the problem that since if two pixels of specified feature space data (such as gradient direction data) are symmetric with respect to a virtual center of the concavity or convexity, the two pixels are regarded as edges of the concavity or convexity, the generation of noise may cause erroneous edge recognition, which results in a decreased measuring accuracy.

The prior art disclosed in Japanese Patent Laid-Open Publication No. 7-225843 is limited to use for measurement of the center of a circle and therefore is not applicable to cases where the concavity or convexity to be recognized is square, rhombic or the like. Furthermore, since the edge detection is based on a two-dimensional image, measurement cannot be made when there exist points which are three-dimensionally distant from the circumference of a circle.

SUMMARY OF THE INVENTION

The invention has been made to overcome the above-described drawbacks, and one of the objects of the invention is therefore to provide an automatic recognition method capable of accurately determining edges of a concavity or convexity in order to ensure an improved measuring accuracy in recognition of the position of a concavity or convexity.

According to the first aspect of the invention for accomplishing the above object, there is provided an automatic recognition method comprising the steps of:

converting a photographic image of an object having a concavity or convexity defined therein into data in a specified feature space;

extracting elementary areas from the converted image data in the feature space;

obtaining a plurality of points that exist outside a virtual circle determined by a virtual center of the concavity or convexity in each extracted elementary area;

obtaining the equation of a plane that passes through the plurality of points;

detecting symmetric pairs of pixels in each elementary area, a symmetric pair of pixels being defined as two pixels the vectors and positions of which are symmetric with respect to the corresponding virtual concavity or convexity center; and regarding the virtual concavity or convexity center of the elementary area having the highest number of symmetric pairs of pixels that satisfy the equation of the plane as the true center of the concavity or convexity and recognizing the position of the concavity or convexity of the object with said true center.

In the invention, the photographic image of an object having a concavity or convexity is converted into specified feature space data such as gradient direction data or normal direction data by, for example, the technique of template matching. While shifting a virtual center of the concavity or convexity on the converted image, a plurality of points existing outside a virtual circle determined by the virtual center and then the equation of a plane that passes through the plurality of points are obtained. Then, symmetric pairs of pixels in each elementary area are detected. A symmetric pair of pixels is defined as two pixels the vectors and positions of which are symmetric with respect to the corresponding virtual concavity or convexity center. The virtual concavity or convexity center of the elementary area having the highest number of symmetric pairs of pixels that satisfy the equation of the plane is determined as the true center of the concavity or convexity and the position of the concavity or convexity is recognized with this true center.

In the invention, since the recognition of a concavity or convexity is performed based on the detection of symmetric pairs of pixels in each elementary area with respect to the corresponding virtual center of the concavity or convexity, the method can be performed with a small storage capacity and short processing time. Additionally, the position of a concavity or convexity can be recognized irrespective of the pose of the three-dimensionally photographed object having the concavity or convexity. Further, since the position of a concavity or convexity is recognized when the symmetric pixels with respect to the virtual center satisfy the equation of the plane, points which are away from the equation more than a certain distance can be excluded thereby eliminating noise, which results in an improved measuring accuracy.

According to the second aspect of the invention, there is provided an automatic recognition method comprising the steps of:

converting a photographic image of an object having at least one concavity or convexity defined therein into data in a specified feature space;

extracting elementary areas from the converted image data in the feature space;

obtaining a plurality of points that exist outside a virtual circle determined by a virtual center of the concavity or convexity in each extracted elementary area;

obtaining the equation of a plane that passes through the plurality of points;

detecting symmetric pairs of pixels in each elementary area, a symmetric pair of pixels being defined as two pixels the vectors and positions of which are symmetric with respect to the corresponding virtual concavity or convexity center; and regarding the virtual concavity or convexity center of at least one elementary area as the true center of said at least one concavity or convexity, provided that the number of symmetric pairs of pixels in the elementary area that satisfy the equation of the plane is no less than a specified number, and recognizing the position of the concavity or convexity of the object with said true center.

In the above aspect, when the number of symmetric pairs of pixels in an elementary area is not less than a specified number, the virtual center established for this elementary area is determined as the true center of a concavity or convexity to recognize the position of the concavity or convexity. With this arrangement, the same inventive effect as that of the first aspect of the invention can be achieved.

In the invention, the photographic image may be a metric image or contrast image. The specified feature space data may be gradient direction data or normal direction data. Preferably, each elementary area may be composed of M×M pixels (M is an integer which is not smaller than 3), and each virtual center may be located at the center of each elementary area.

BRIEF DESCRIPTION OF THE DRAWINGS

FIG. 7 shows the Z coordinate metric image converted into the gradient vector space.

FIG. 8 shows a set of masks used for template matching.

FIGS. 9(a) and 9(b) illustrate counting of the number of two symmetric pixels with respect to a virtual center A.

FIGS. 10(a) and 10(b) illustrate processing of points deviated from the equation of a plane.

FIG. 14 shows an X coordinate metric image after smoothing according to the second embodiment.

FIG. 15 shows a Y coordinate metric image after smoothing according to the second embodiment.

FIG. 16 shows a Z coordinate metric image after smoothing according to the second embodiment.

FIG. 17 shows a cluster of reference normal vectors used for template matching according to the second embodiment.

FIG. 18 shows an X, Y, Z coordinate metric image in the normal vector space according to the second embodiment.

BEST MODE FOR CARRYING OUT THE INVENTION

With reference to the accompanying drawings, preferred embodiments of an automatic recognition method according to the invention will be hereinafter described.

Figure 1:
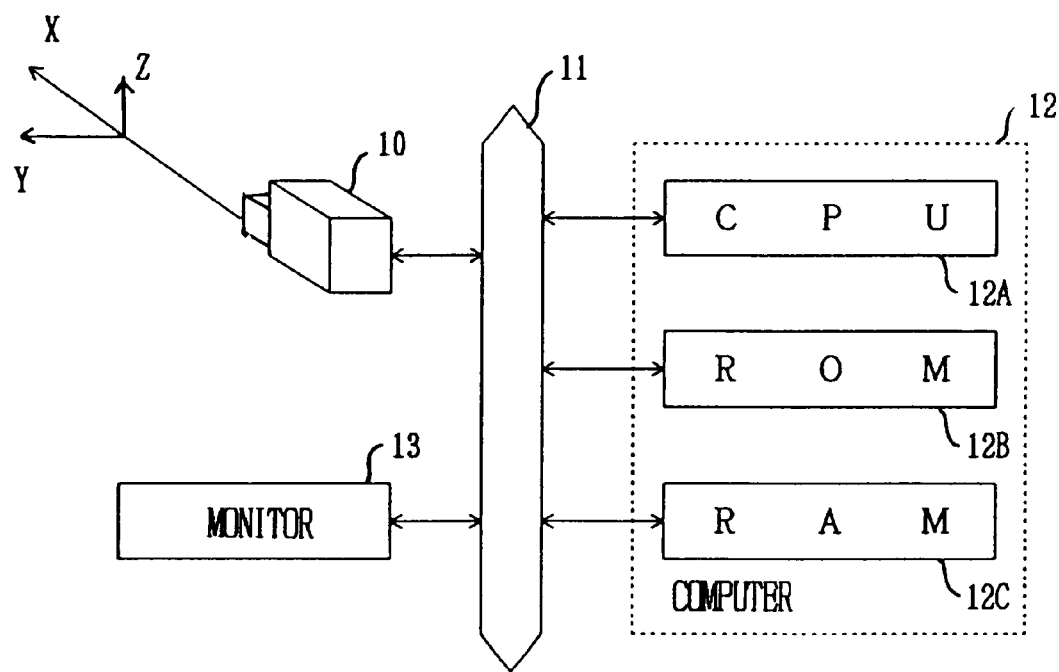
FIG. 1 is a block diagram of a system structure for use in an automatic recognition method according to a first embodiment of the invention.

As shown in FIG. 1, an object having a concavity (i.e., hole in this embodiment) is picked up by a three-dimensional camera 10 and a Z coordinate metric image which represents the depth of the object is moved onto a bus 11 to output to a computer 12, together with an X coordinate metric image and Y coordinate metric image. The computer 12 is composed of a central processing unit (CPU) 12A for executing a specified program; a read only memory (ROM) 12B for storing the specified program; various registers necessary for executing the program; and a random access memory (RAM) 12C that has a working area including a storage for the X, Y and Z coordinate metric images, Prewitt operator ("Image Analysis Handbook", P554 to 555, Mikio Takagi et al. University Tokyo Press) and a model created in a feature space. While the computer 12 executing the specified program, a monitor 13 displays positional data on the hole defined in the photographed object.

Figure 2:
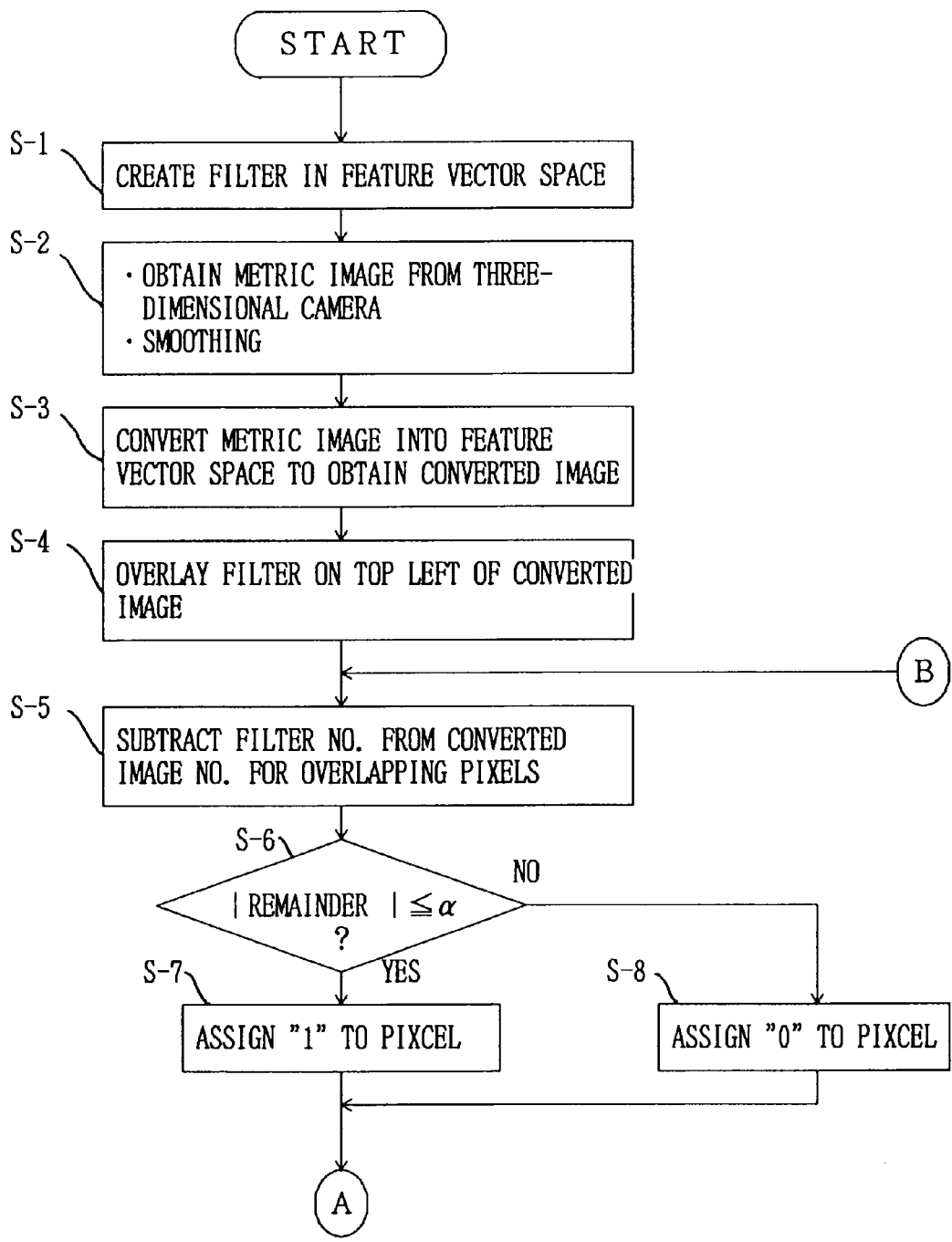
FIG. 2 is a flow chart (first stage) of a program for the automatic recognition method according to the first embodiment.
Figure 3:
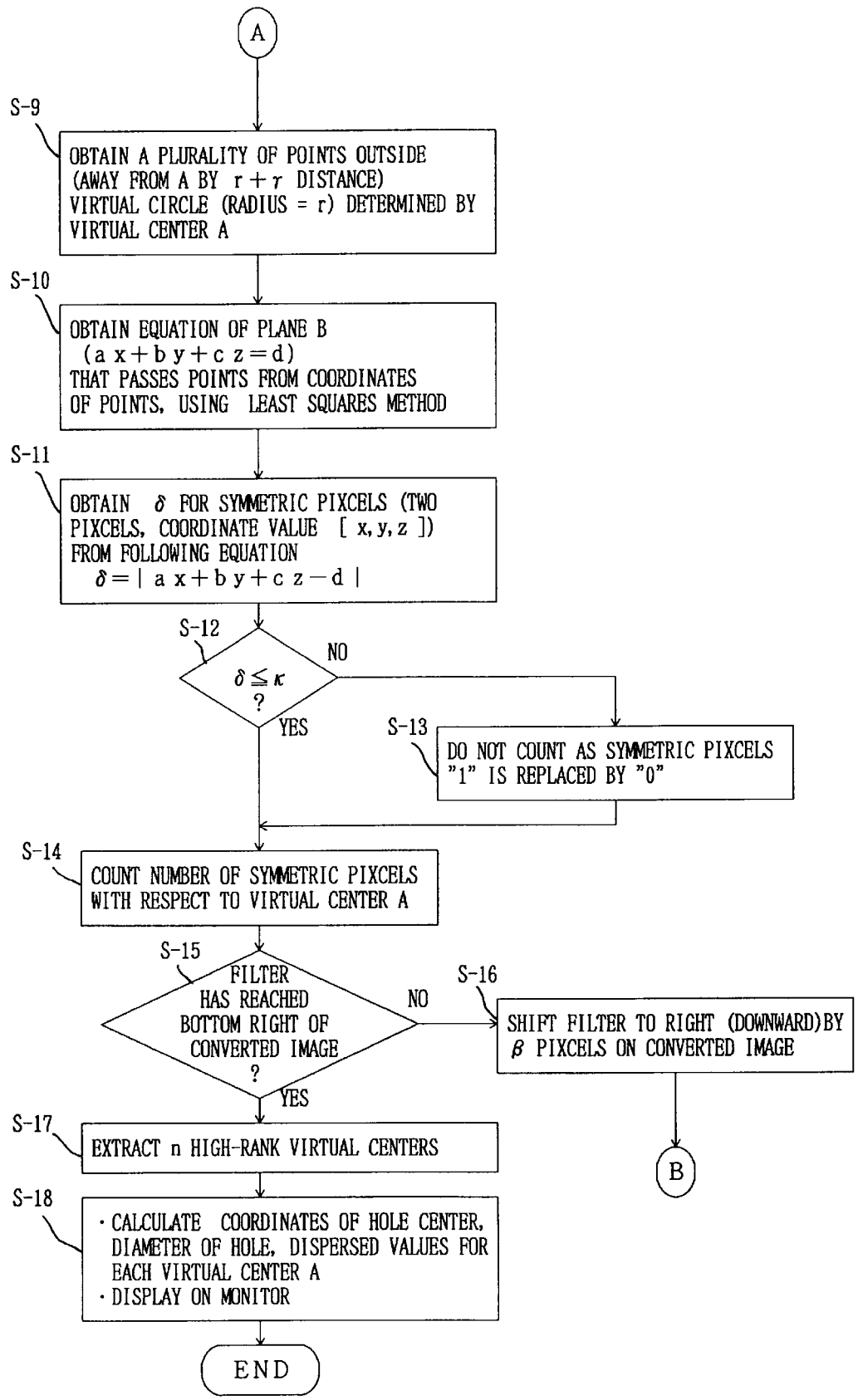
FIG. 3 is a flow chart (second stage) of the program for the automatic recognition method according to the first embodiment.

Referring now to the flow charts of FIGS. 2 and 3, the basic operation performed according to the above program will be described below.

Figures 4, 5, 6:
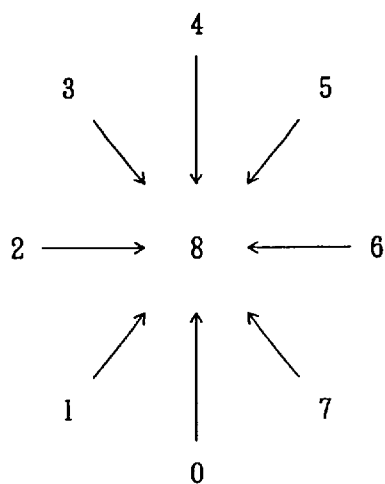
FIG. 4 shows a model in a gradient vector space.
FIG. 5 shows the relationship between the direction of each gradient vector which is directed toward the center of a hole and a number assigned to each vector.
FIG. 6 shows a Z coordinate metric image after smoothing.

S-1: First of all, an M×M pixel region (3×3 pixel region in this embodiment), one side of which consists of M pixels and exceeds the diameter of the hole (i.e., concavity) of the object to be recognized, is created. As shown in FIG. 4, 9 pixels constitute the M×M pixel region and, specifically, 8 pixels are radially arranged with respect to one pixel positioned at the center (this pixel is hereinafter referred to as "object pixel"). In order to represent the feature of the hole to be recognized having its center at the object pixel, a number is assigned to each pixel. More concretely, the numbers assigned to the pixels except for the object pixel represent the gradient vector directions shown in FIG. 5 and the number "8" assigned to the object pixel indicates that the pixel does not have a vector direction. Such a filter in a feature space (gradient vector space in this embodiment) is created as shown in FIG. 4.

S-2: N×N pixels (N≧M)(7×7 pixels in this embodiment) of X, Y and Z coordinate metric images are taken from the three-dimensional camera 10. In this embodiment, 7×7 pixels of the metric images are obtained. Then, smoothing is sufficiently applied to the X, Y, Z coordinate metric images, thereby obtaining a Z coordinate metric image. The Z coordinate metric image obtained after smoothing in this embodiment is shown in FIG. 6. In the Z coordinate metric image shown in FIG. 6, the greater the number is, the further the pixel is positioned from the three-dimensional camera 10 in the direction of Z-axis.

S-3: The Z coordinate metric image shown in FIG. 6 is converted into an image in feature space as shown in FIG. 7, by determining the feature of each pixel of the Z coordinate metric image of FIG. 6 in the following manner, using template matching according to Prewitt Method.

First, the strongest gradient vector direction for each pixel is searched, and this vector direction is assigned to the corresponding pixel, thereby converting Z coordinate metric image data possessed by each pixel into gradient vector direction data. In this embodiment, template matching is used for the assignment of the gradient vector directions in the conversion. The template matching uses 8 kinds of mask patterns shown in FIG. 8 which respectively correspond to the gradient vector directions, and the numbers respectively assigned to the gradient vector directions in FIG. 8 link to those assigned to the gradient vector directions shown in FIG. 5. Each mask pattern is matched to each 3×3 pixel region of the Z coordinate metric image shown in FIG. 6, the region of which, specifically, includes one object pixel and 8 pixels enclosing the object pixel, and each pixel of the Z coordinate metric image is multiplied by the corresponding value of each mask pattern. Then, the products obtained by one mask pattern are summed and the mask pattern by which the largest sum has been obtained is found. The number allocated to the gradient vector direction corresponding to the mask pattern which has the largest sum is allocated to the object pixel.

S-4 to S-8: The filter shown in FIG. 4 is overlaid on the top left of the converted image shown in FIG. 7 in such a manner that the virtual center A of the concavity of the object is located on a position that is up to the left from the center of the converted image. As to the pixels overlapping with each other, the number assigned to each pixel of the filter is subtracted from the number assigned to the corresponding pixel of the converted image. If the remainder is not more than ±α, "1" is assigned to the pixel, and if the remainder is more than ±α, "0" is assigned to the pixel. In this embodiment, α is "0" and therefore the result is as shown in FIG. 9(*a*).

S-9 to S-13: A plurality of points existing outside the circle (radius=r) determined by the virtual center A, that is, a plurality of points at distances of r+γ from the virtual center A are obtained. Then, the equation of a plane, which passes through the plurality of points and is described as follows, is obtained from the respective coordinates of these plurality of points using the mean squares method.

$$aX+bY+cZ=d$$

Thereafter, the distance between each pixel (given by coordinates (x, y, z)) of each symmetric pair and the above plane, namely, the length δ of a vertical line extending from each pixel of each symmetric pair to the plane is calculated with the following equation.

$$\delta = |ax+by+cz-d|$$

Figures 10A, 10B:
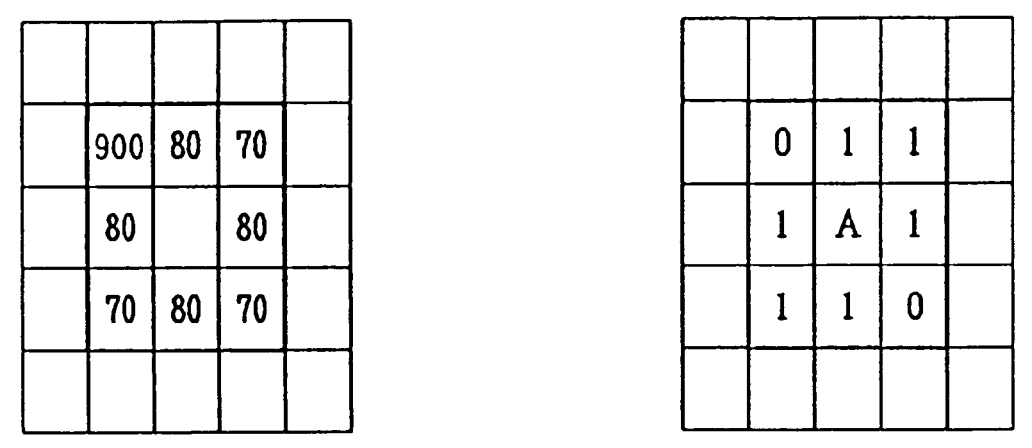

If the distance δ of each pixel of a symmetric pair is less than a specified threshold k (δ≦k), the symmetric pair will be included in counting of symmetric pixels. If the distance δ of each pixel exceeds the threshold k (δ>k), the symmetric pair will not be included in counting and "1" assigned to the symmetric pair is changed to "0". For example, if there exists a value of 900 exceeding the threshold as shown in FIG. 10(*a*) as one value of the Z coordinate metric image, the symmetric pair corresponding to 900 (shown in FIG. 9(*b*)) will not be counted but "1" is replaced by "0" as shown in FIG. 10(*b*).

S-14 to S-16: In the case of the result shown in FIG. 9(*a*), the number of two pixels which are symmetric to each other with respect to the corresponding virtual center A is counted. In this case, there are no symmetric pairs of pixels and therefore, "0" is set in the count table shown in FIG. 11 at the position corresponding to the position of the associated virtual center A.

Figures 11, 12, 13:
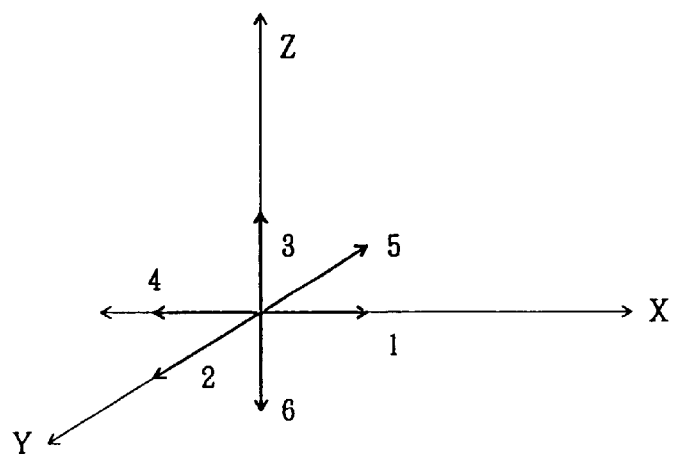
FIG. 11 shows a count table.
FIG. 12 shows a model in a normal vector space according to a second embodiment of the invention.
FIG. 13 shows the relationship between the direction of each normal vector which is directed toward the center of a hole and a number assigned to each vector.

In this way, the virtual center A is shifted on the converted image. In particular, a shift amount β is determined by a operator. More specifically, the filter is shifted to the right by β pixels (one pixel in this embodiment) and when the filter reaches the right end, the filter is shifted down by β pixels (i.e., one pixel) and then similarly shifted from the left to the right by one pixel until the filter reaches and overlaps the set of pixels at the bottom right of the converted image. With this operation, a count table as shown in FIG. 11 is obtained. When the filter is overlaid similarly to the case of FIG. 9(*a*) such that the virtual center A is positioned at the center of the converted image, the result is as shown in FIG. 9(*b*). In the case of FIG. 9(*b*), the number of symmetric pairs of pixels, which are to be counted and symmetric with respect to the virtual center A, is "4", so that "4" is set in the count table of FIG. 11 at the position corresponding to the position of the associated virtual center A.

S-17: From the virtual centers A shown in the count table of FIG. 11, n high-rank virtual centers A (i.e., the virtual centers A having the first to n-th highest count number of symmetric two pixels) are extracted. "n" corresponds to the number of holes of the object which has been presumed and preset. In this embodiment, n=1, so that the virtual center A to be extracted is one positioned in the middle of the count table of FIG. 11, that is, the object pixel of the Z coordinate metric image after smoothing shown in FIG. 6.

S-18: All the symmetric pixels with respect to each extracted virtual center A are regarded as edges of each hole. Concretely, the positions of "1"s in the FIG. 9(*b*) are regarded as edges of a hole in this embodiment. For each hole, the total X coordinate value, total Y coordinate value, total Z coordinate value of the symmetric pixels are obtained by conversion of the X, Y, Z coordinate metric images of the pixels regarded as edges. Then, the coordinates of the center of the hole and the diameter of the hole for the corresponding virtual center A are determined according to the following.

Coordinates of hole center: (ΣX/P, ΣY/P, ΣZ/P) Diameter of hole:

Σ the sum of distances between each pair of pixels/P where

P: number of symmetric pairs of pixels

ΣX: total X-coordinate value of all symmetric pixels

ΣY : total Y-coordinate value of all symmetric pixels

ΣZ: total Z-coordinate value of all symmetric pixels

Then, the dispersed values of the symmetric pixels for each virtual center A when the symmetric pixels are applied to a sphere are calculated by the least squares method.

It is then determined whether the diameter of the hole and the dispersed values for each virtual center A, which have been obtained by the calculation, respectively fall in their preset allowable ranges. If they fall in their preset allowable ranges, the virtual center A corresponding to them is determined as the true center of the hole, and the coordinates of the hole center, the diameter of the hole etc. for the virtual center A are displayed on the monitor 13.

Although the feature of the hole of the object is represented by 8 kinds of gradient vectors having different directions, it may be represented by 12 gradient vectors having different directions in order to achieve higher accuracy, or by 4 gradient vectors having different directions in order to increase the processing speed. Instead of "Prewitt method", "Robinson method" or "Kirsh method" may be used for converting the Z coordinate metric image into the image in the feature space ("Image Analysis Handbook", P554 to 555, Mikio Takagi et al. University Tokyo Press).

In the foregoing embodiment, the number of holes defined in the object is assumed and preset as n, and n high-rank virtual centers A are extracted based on the number of symmetric two points with respect to each virtual center A. However, the virtual centers A may be automatically extracted using "P tile method" or "Ohtsu method" ("Image Analysis Handbook", P502 to 505, Mikio Takagi et. al. University Tokyo Press).

Further, although gradient vector space data is used as feature space data in the foregoing embodiment, normal vector space data may be used in the following way.

A 3×3 pixel region is first set like the foregoing embodiment, and the numbers which are assigned to the respective normal vectors shown in FIG. 13 and representative of the normal vector directions are assigned to the pixels of the 3×3 pixel region respectively, as shown in FIG. 12. Thus, a filter in a normal vector space is created.

Then, 7×7 pixels of X coordinate metric image, Y coordinate metric image and Z coordinate metric image are obtained from the three-dimensional camera 10 and smoothing is applied to these images like the foregoing embodiment, whereby the X coordinate metric image, Y coordinate metric image and Z coordinate metric image (this is similar to one shown in FIG. 6) shown in FIGS. 14 to 16 are obtained. In this embodiment, a 3×3 pixel region is regarded as the smallest unit of a plane and the normal vectors of the plane are obtained in the following manner.

In the case of the X coordinate metric image, Y coordinate metric image and Z coordinate metric image shown in FIGS. 14 to 16 for example, vectors $\overrightarrow{BA}$, $\overrightarrow{DC}$ are first obtained.

$\overrightarrow{BA}$=(20, 20, 70)−(0, 0, 40)=(20, 20, 30)

$\overrightarrow{DC}$=(0, 20, 40)−(20, 0, 40)=(−20, 20, 0)

Then, a normal vector δ is obtained from the vectors $\overrightarrow{BA}$, $\overrightarrow{DC}$.

$\vec{\delta} = \overrightarrow{DC} \times \overrightarrow{BA}$=(600, 600, −800)

Then, the vector δ is converted to unit vector.

$\vec{\delta e} = \vec{\delta}/|\vec{\delta}|$ = (0.514, 0.514, −0.686)

The maximum value is obtained by template matching, using 6 kinds of reference normal vectors shown in FIG. 17 which correspond to the normal vector directions shown in FIG. 13. The number assigned to the reference normal vector direction which corresponds to the maximum value is assigned to the pixel. In the above example, $\vec{\delta}$ =(0, 0, −1) is assigned.

The arithmetic operation described earlier is performed sequentially on the X, Y, Z coordinate metric image composed of the X coordinate metric image, Y coordinate metric image and Z coordinate metric image, thereby converting the X, Y, Z coordinate metric images shown in FIGS. 14 to 16 into an image in the normal vector space.

The filter shown in FIG. 12 is overlaid on the converted image shown in FIG. 18 and symmetric pairs of pixels are sequentially counted in the same manner as described earlier.

More precise template matching is possible by using vectors of diagonal directions such as $(1/\sqrt{2}, 1/\sqrt{2}, 0)$, $(0, 1/\sqrt{2}, 1/\sqrt{2})$ and $(1/\sqrt{2}, 0, 1/\sqrt{2})$ in addition to the reference normal vectors.

In this embodiment, a small filter, i.e., a 3×3 pixel region is used as the filter in the feature space. However, a 64×64 pixel region may be used. In this case, the 64×64 pixel region filter is overlaid on the converted image such that each pixel of the filter overlaps a pixel of the image, and the number assigned to each pixel of the filter is subtracted from the number assigned to the corresponding pixel of the converted image. In this case, subtraction is performed 64×64=4,096 times. Since the number of subtracting operations to be performed is proportional to the square of the number of pixels M, as the number of pixels M in the M×M pixel region increases, the number of operations increases resulting in a decreased processing speed. In order to prevent the decrease in the processing speed when the number of pixels M increases, the following technique is adapted. For example, when the square of the number of pixels M is not less than a specified value ψ, m which satisfies the following equation is obtained. m is converted into an integer and each subtraction is performed after skipping m pixels. With this technique, the processing time will not decrease to more than a certain extent even if the number of pixels M increases.

$(M/m)^2 = \psi$

For example, when the specified value ψ is 100 (i.e., when the number of pixels M is 10 or more) and the number of pixels M is 64, m is obtained from the following equation.

$m = M/\sqrt{\psi} = 64/\sqrt{100} = 6.4$

Therefore, each subtraction is performed after skipping 6 pixels.

Although the position of a hole (concavity) defined in an object is recognized in the foregoing embodiments, convexities may be recognized by setting an appropriate model in a feature space. Additionally, grooves (one example of concavities) or bars (one example of the convexities) may be recognized.

Although the position of a concavity is recognized based on the three-dimensional metric image of the object, it may be recognized based on a contrast image in place of a metric image. In addition, the following way may be adapted. Points having differentials or differentials of the second order which are more than a specified value are extracted from a metric image or contrast image. The number of symmetric pairs of pixels with respect to the cluster of extracted points is counted. With this method, a concavity or convexity defined in an object can be recognized although their exact coordinates cannot be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic recognition method, comprising the steps of:

converting a photographic image of an object having a concavity or convexity defined therein into data in a specified feature space;

extracting elementary areas from the converted image data in the feature space;

obtaining a plurality of points that exist outside a virtual circle determined by a virtual center of the concavity or convexity in each extracted elementary area;

obtaining the equation of a plane that passes through the plurality of points;

detecting symmetric pairs of pixels in each elementary area, a symmetric pair of pixels being defined as two pixels the vectors and positions of which are symmetric with respect to the corresponding virtual concavity or convexity center; and regarding the virtual concavity or convexity center of the elementary area having the highest number of symmetric pairs of pixels that satisfy the equation of the plane as the true center of the concavity or convexity and recognizing the position of the concavity or convexity of the object with said true center.

2. An automatic recognition method, comprising the steps of:

converting a photographic image of an object having at least one concavity or convexity defined therein into data in a specified feature space;

extracting elementary areas from the converted image data in the feature space;

obtaining a plurality of points that exist outside a virtual circle determined by a virtual center of the concavity or convexity in each extracted elementary area;

obtaining the equation of a plane that passes through the plurality of points;

detecting symmetric pairs of pixels in each elementary area, a symmetric pair of pixels being defined as two pixels the vectors and positions of which are symmetric with respect to the corresponding virtual concavity or convexity center; and regarding the virtual concavity or convexity center of at least one elementary area as the true center of said at least one concavity or convexity, provided that the number of symmetric pairs of pixels in the elementary area that satisfy the equation of the plane is no less than a specified number, and recognizing the position of the concavity or convexity of the object with said true center.

3. An automatic recognition method according to claim 1 or 2, wherein said photographic image is a metric image or contrast image.

4. An automatic recognition method according to claim 1 or 2, wherein said specified feature space data is gradient direction data or normal direction data.

5. An automatic recognition method according to claim 1 or 2, wherein said elementary area is composed of M×M pixels, with M being an integer which is not smaller than 3, and wherein each virtual center is located at the center of each elementary area.

* * * * *